United States Patent
Sambhwani et al.

(10) Patent No.: US 8,102,795 B2
(45) Date of Patent: Jan. 24, 2012

(54) CHANNEL EQUALIZATION WITH NON-COMMON MIDAMBLE ALLOCATION IN 3GPP TD-CDMA SYSTEMS

(75) Inventors: Sharad Deepak Sambhwani, San Diego, CA (US); Avneesh Agrawal, San Diego, CA (US); Juan Montojo, San Diego, CA (US); Waleed M. Younis, Tustin, CA (US)

(73) Assignee: QUALCOMM Incorporated, San Diego, CA (US)

( * ) Notice: Subject to any disclaimer, the term of this patent is extended or adjusted under 35 U.S.C. 154(b) by 902 days.

(21) Appl. No.: 11/684,251

(22) Filed: Mar. 9, 2007

(65) Prior Publication Data

US 2008/0219342 A1    Sep. 11, 2008

(51) Int. Cl.
*H04B 7/212* (2006.01)

(52) U.S. Cl. ........ 370/321; 370/329; 370/458; 455/101; 455/452.1; 455/67.11

(58) Field of Classification Search ............. 370/329, 370/458, 332, 333, 335, 337, 221, 280, 321; 455/101, 452.1, 67.11, 69, 491, 500, 458; 375/267, 299, 347
See application file for complete search history.

(56) References Cited

U.S. PATENT DOCUMENTS

| | | | |
|---|---|---|---|
| 2002/0067774 A1* | 6/2002 | Razoumov et al. | 375/316 |
| 2005/0058103 A1* | 3/2005 | Jeong et al. | 370/335 |
| 2005/0249305 A1* | 11/2005 | Ponnampalam et al. | 375/267 |

FOREIGN PATENT DOCUMENTS

| | | |
|---|---|---|
| EP | 1499032 | 1/2005 |
| KR | 20020020960 | 3/2002 |
| KR | 20030051899 | 6/2003 |
| WO | 0152489 | 7/2001 |
| WO | WO0197475 A1 | 12/2001 |

OTHER PUBLICATIONS

International Search Report, PCT/US08/056042, International Search Authority, European Patent Office, Jul. 28, 2008.
Written Opinion, PCT/US08/056042, International Search Authority, European Patent Office, Jul. 28, 2008.
Steiner et al., "Optimum and Suboptimum Channel Estimation for the Uplink of CDMA Mobile Radio Systems with Joint Detection," European Transactions on Telecommunications and Related Technologies, Jan. 1, 1994, pp. 39-50, vol. 5, No. 1, AEI, Milano, IT, XP000445714.
Translation of Office Action in Korean application 10-2009-7021114 corresponding to U.S. Appl. No. 10/684,251, citing US20050249305, KR20020020960 and KR200351899 dated Jan. 26, 2011.

* cited by examiner

*Primary Examiner* — Kamran Afshar
*Assistant Examiner* — Manpreet Matharu
(74) *Attorney, Agent, or Firm* — Stanton Braden

(57) ABSTRACT

Systems and methodologies are described that facilitate implementing a linear adaptive equalizer receiver on the downlink link of a UMTS TDD wireless communication system. A reference signal can be generated based on multiple non-common midamble sequences in a time slot of a received transmission. Traffic-to-pilot ratios for channel codes in the time slot can be generated, and relative strengths of channel codes associated with specific midambles can be determined to weight the midamble. A plurality of the weighted midambles can then be utilized to generate a reference signal to train the equalizer, which can facilitate utilization of total aggregate midamble energy rather than midamble energy associated with a single midamble in the signal.

25 Claims, 10 Drawing Sheets

CHANNEL EQUALIZATION WITH NON-COMMON MIDAMBLE ALLOCATION IN 3GPP TD-CDMA SYSTEMS

BACKGROUND

I. Field

The following description relates generally to wireless communications, and more particularly to employing a non-common midamble allocation scheme in conjunction with a linear adaptive equalizer.

II. Background

Wireless communication systems have become a prevalent means by which a majority of people worldwide has come to communicate. Wireless communication devices have become smaller and more powerful in order to meet consumer needs and to improve portability and convenience. The increase in processing power in mobile devices such as cellular telephones has lead to an increase in demands on wireless network transmission systems. Such systems typically are not as easily updated as the cellular devices that communicate there over. As mobile device capabilities expand, it can be difficult to maintain an older wireless network system in a manner that facilitates fully exploiting new and improved wireless device capabilities.

Code division based techniques typically transmit data over a number of frequencies available at any time in a range. In general, data is digitized and spread over available bandwidth, wherein multiple users can be overlaid on the channel and respective users can be assigned a unique sequence code. Users can transmit in the same wide-band chunk of spectrum, wherein each user's signal is spread over the entire bandwidth by its respective unique spreading code. This technique can provide for sharing, wherein one or more users can concurrently transmit and receive. Such sharing can be achieved through spread spectrum digital modulation, wherein a user's stream of bits is encoded and spread across a very wide channel in a pseudo-random fashion. The receiver is designed to recognize the associated unique sequence code and undo the randomization in order to collect the bits for a particular user in a coherent manner.

A typical wireless communication network (e.g., employing frequency, time, and code division techniques) includes one or more base stations that provide a coverage area and one or more mobile (e.g., wireless) terminals that can transmit and receive data within the coverage area. A typical base station can simultaneously transmit multiple data streams for broadcast, multicast, and/or unicast services, wherein a data stream is a stream of data that can be of independent reception interest to a mobile terminal. A mobile terminal within the coverage area of that base station can be interested in receiving one, more than one, or all the data streams carried by the composite stream. Likewise, a mobile terminal can transmit data to the base station or another mobile terminal. Such communication between base station and mobile terminal or between mobile terminals can be degraded due to channel variations and/or interference power variations. For example, the aforementioned variations can affect base station scheduling, power control, and/or rate prediction for one or more mobile terminals.

Conventional non-common midamble allocation protocols, such as default or user-specific midamble allocation schemes typically do not provide the same demodulation performance as can be achieved with a common midamble allocation protocol. Thus, there is an unmet need in the art for a system and/or methodology of improving throughput in such wireless communication systems.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with training a linear adaptive equalizer using an aggregation of non-common midamble energies received in a timeslot of a communication signal. According to one aspect, a method of supporting linear adaptive equalization with non-common midamble allocation in a wireless communication environment can comprise detecting non-common pilot sequences in channel codes received in a time slot, generating a reference signal based at least in part on multiple non-common pilot sequences, and utilizing the reference signal to train an equalizer to perform channel equalization. The method can further comprise determining a traffic-to-pilot ratio for an active channel code in the time slot by estimating relative power of a first data portion of the active code and a second data portion of the active code and dividing a total relative power of the data portions by the transmission power of the non-common pilot associated with the active channel code. The method can still further comprise determining a weight for a pilot sequence based at least in part on a sum of the relative strengths of channels codes mapped to the pilot sequence. The non-common pilot sequence can be, for example a pilot sequence allocated according to a default pilot allocation scheme, a user-specific pilot allocation scheme, etc. An aggregate value associated with a plurality of weighted non-common pilot sequences can be employed to generate the reference signal to train an equalizer, such as a linear adaptive equalizer or the like.

According to another aspect, an apparatus that facilitates utilizing multiple non-common midambles, or pilots, to train a linear adaptive equalizer receiver comprises a receiver that receives a signal with a non-common pilot allocation comprising multiple pilot sequences, a memory that stores information related to a channel codes and associated non-common pilot sequences, and a processor that analyzes information stored in the memory and generates a reference signal based at least in part on multiple weighted pilots. The receiver can be, for instance, a linear adaptive equalizer receiver. The apparatus can further comprise a traffic-to-pilot estimator that determines a traffic-to-pilot ratio for at least one channel code and a pilot associated therewith. The traffic-to-pilot estimator can perform a fast Hadamard transform protocol to estimate the relative power strength of each of a plurality of channel codes. The processor can analyze information stored in the memory related to a mapping of channel codes to pilot sequences and can determine an appropriate weight for each pilot sequence based at least in part on a sum of the relative strengths of all channel codes mapping to respective pilot sequences. The processor can further generate the improved reference signal with information related to an aggregate pilot energy comprising the sum of weighted pilots in the received signal in order to train the equalizer while utilizing all pilot energy rather than pilot energy associated with only a single non-common pilot sequence.

According to yet another aspect, an apparatus that facilitates employing a non-common midamble allocation scheme in conjunction with a linear adaptive equalizer receiver can comprise means for receiving a signal with a non-common pilot sequence allocation, means for evaluating a traffic-to-pilot ratio for channel codes in the signal, and means for generating a reference signal based at least in part on multiple non-common pilot sequences. The apparatus can further comprise means for estimating a data portion of a channel code in the time slot, means performing a fast Hadamard transform to estimate the data portion of the channel code in the time slot, and means for determining a traffic-to-pilot ratio comprising the relative power of the data portion divided by the power of a pilot sequence allocated to the channel code. The apparatus can be employed in, for example, a UMTS terrestrial radio access communication environment.

Still another aspect relates to a computer-readable medium having stored thereon computer-executable instructions for receiving a signal with a default pilot sequence allocation, evaluating a traffic-to-pilot ratio for channel codes in the signal, and generating a reference signal based at least in part on multiple default pilot sequences. The computer-readable medium can further comprise instructions for determining a traffic-to-pilot ratio to weight a pilot sequence comprising the relative power of the data portion divided by the power of a pilot sequence allocated to the channel code, and for training a channel equalizer by employing the reference signal.

Yet another aspect relates to a processor that executes instructions for employing a linear adaptive equalizer in conjunction with a non-common pilot allocation protocol in a time slot of a downlink transmission, the instructions comprising receiving a signal with a default pilot sequence allocation, evaluating a traffic-to-pilot ratio for channel codes in the signal, and generating a reference signal based at least in part on multiple default pilot sequences. The processor can further execute instructions for weighting pilot sequences according to traffic-to-pilot ratios derived for a plurality of channel codes in a time slot of the signal. Moreover, the processor can be employed in a UMTS TDD wireless communication environment, such as a UMTS terrestrial radio access communication environment.

A further aspect relates to a user device that facilitates permitting linear adaptive equalization based on multiple non-common midambles, comprising a linear adaptive equalizer that receives a signal comprising multiple non-common pilot sequences, and a processor that estimates a data portion of a user code in a time slot, determines a traffic-to-pilot power ratio, and generates a reference signal for training the equalizer based at least in part on multiple non-common pilot sequences and traffic-to-pilot power ratios. The user device can be, for example, a cellular phone, a smartphone a PDA, a laptop, a handheld communication device, a handheld computing device, a satellite radio, a global positioning system device, etc.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION

Figure 1:
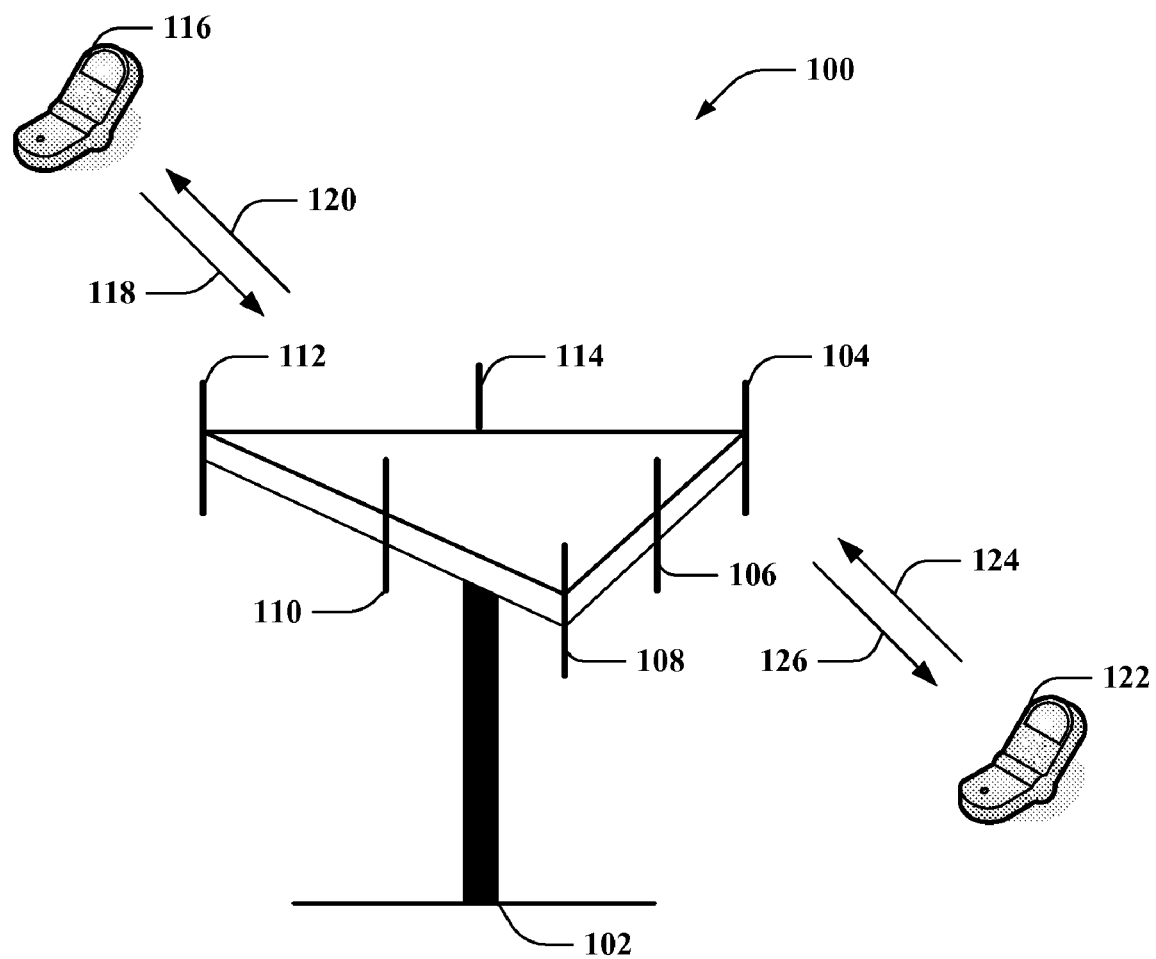
FIG. 1 is an illustration of a multiple access wireless communication system, according to one or more embodiments.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

As used in this application, the terms "component," "system," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. One or more components may reside within a process and/or thread of execution and a component may be localized on one computer and/or distributed between two or more computers. Also, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Furthermore, various embodiments are described herein in connection with a subscriber station. A subscriber station can also be called a system, a subscriber unit, mobile station, mobile, remote station, access point, base station, remote terminal, access terminal, user terminal, user agent, or user equipment. A subscriber station may be a cellular telephone, a cordless telephone, a Session Initiation Protocol (SIP) phone, a wireless local loop (WLL) station, a personal digital assistant (PDA), a handheld device having wireless connection capability, or other processing device connected to a wireless modem.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ).

FIG. 1 is an illustration of a multiple access wireless communication system 100 according to one or more embodiments. A 3-sector base station 102 includes multiple antenna groups, one including antennas 104 and 106, another including antennas 108 and 110, and a third including antennas 112 and 114. According to the figure, only two antennas are shown for each antenna group, however, more or fewer antennas may be utilized for each antenna group. Mobile device 116 is in communication with antennas 112 and 114, where antennas 112 and 114 transmit information to mobile device 116 over forward link 120 and receive information from mobile device 116 over reverse link 118. Mobile device 122 is in communication with antennas 104 and 106, where antennas 104 and 106 transmit information to mobile device 122 over forward link 126 and receive information from mobile device 122 over reverse link 124.

Each group of antennas and/or the area in which they are designated to communicate is often referred to as a sector of base station 102. In the illustrated embodiment, antenna groups each are designed to communicate to mobile devices in a sector of the areas covered by base station 102. In communication over forward links 120 and 126, the transmitting antennas of base station 102 can utilize beam-forming techniques in order to improve the signal-to-noise ratio of forward links for the different mobile devices 116 and 122. Additionally, a base station using beam-forming to transmit to mobile devices scattered randomly through its coverage area causes less interference to mobile devices in neighboring cells/sectors than a base station transmitting through a single antenna to all mobile devices in its coverage area. A base station may be a fixed station used for communicating with the terminals and may also be referred to as an access point, a Node B, or some other terminology. A mobile device may also be called a mobile station, user equipment (UE), a wireless communication device, terminal, access terminal, user device, or some other terminology. A user device or the like, as described herein can be, for example, a cellular phone, a smartphone, a laptop, a PDA, a handheld communication device, a handheld computing device, a satellite radio, a global positioning system, or any other suitable device for communicating over a wireless network, as will be appreciated by one skilled in the art.

In accordance with various aspects presented herein, non-common midamble allocation schemes can be employed to facilitate detection of user devices on a communication uplink and/or on a downlink. Conventional UMTS terrestrial radio access (UTRA) time division duplexed (TDD) systems define several midamble allocation schemes, such as user-specific midambles, default midambles, and/or common midambles. Typically, the common midamble allocation has been applied only to downlink transmissions, whereas user-specific and default allocation schemes have been applied to uplink transmissions as well as downlink transmissions. According to a user-specific midamble allocation scheme, higher layers explicitly assign a particular midamble to a given user device, whereas a default allocation scheme typically employs a fixed mapping between channelization codes and midambles.

In accordance with one or more embodiments set forth herein, a default midamble allocation can be employed in conjunction with a linear adaptive equalizer on a downlink in a wireless communication environment, such as a UMTS TDD system, UTRA TDD system, etc. For example, default and/or user-specific midamble allocation schemes can be employed in conjunction with various aspects to improve linear adaptive channel equalization.

Figure 2:
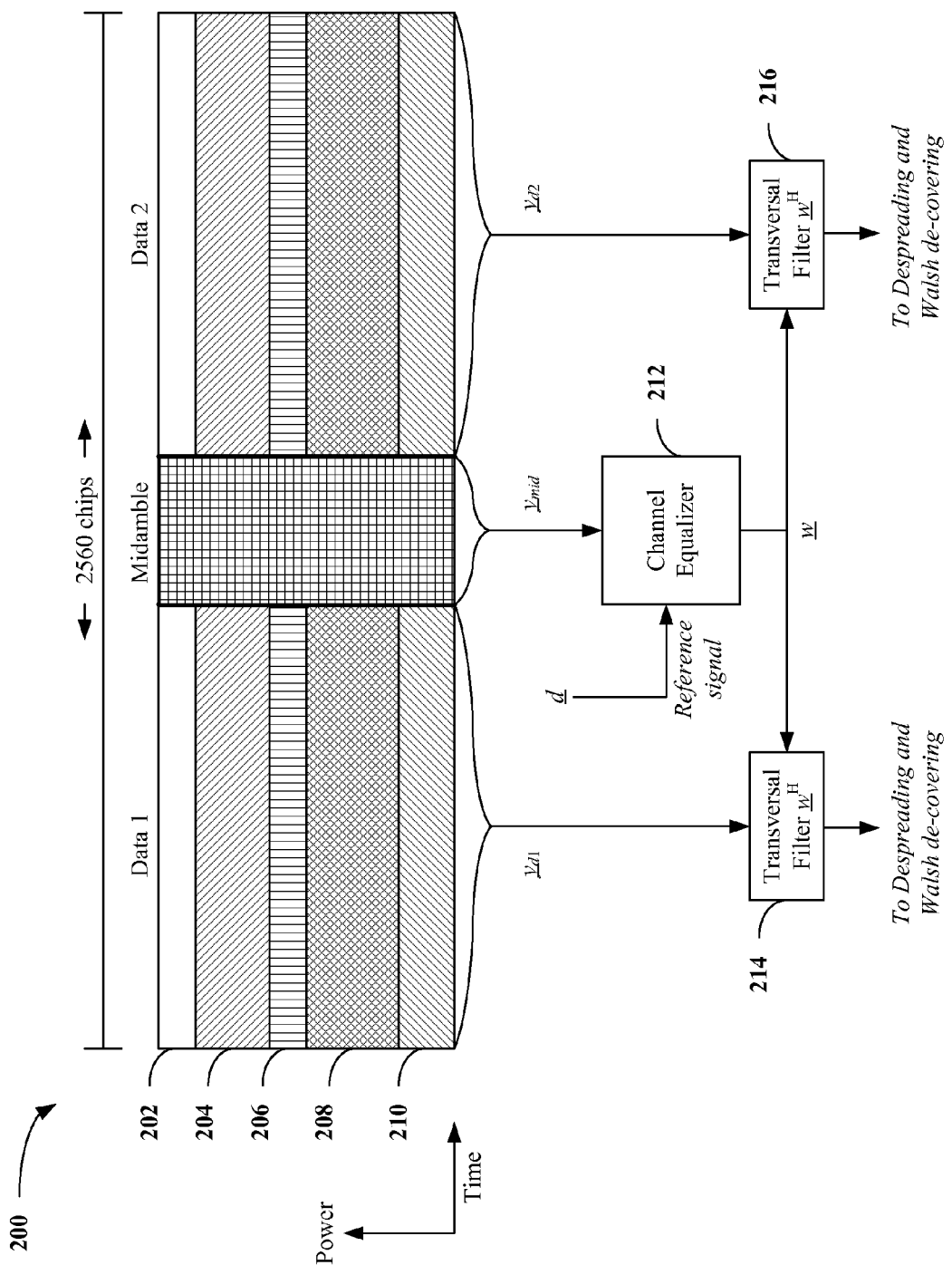
FIG. 2 is an illustration of a high-level block diagram of a system that facilitates performing a common midamble allocation scheme in conjunction with a linear adaptive equalizer, in accordance with one or more aspects.

FIG. 2 is an illustration of a high-level block diagram of a system 200 that facilitates performing a common midamble allocation scheme in conjunction with a linear adaptive equalizer, in accordance with one or more aspects. System 200, as illustrated, comprises a plurality of codes 202-210, allocated to respective individual users. User codes 202-210 are segmented to show a first data section, "Data1", a "midamble" section, and a second data section, "Data2." Midambles for user codes 202-210 are directly employed, in conjunction with a reference signal d, by a channel equalizer 212 to generate estimates of channels for each user in a network sector. When employing a default allocation scheme, a midamble associated with each code is different from any other midamble, such that channel estimation can be performed the same way regardless of whether it is being performed on the uplink or the downlink. Accordingly, a single receiver type, such as a linear equalizer or a RAKE filter, can be employed on the uplink or the downlink when using a default allocation. With the use of the common midamble illustrated in FIG. 2, channel equalizer 212 can generate channel estimates and provide them to a transversal filter 214 that receives information related to the Data1 portion of the transmission, which in turn outputs a signal for despreading and Walsh de-covering, as will be understood by those skilled in the art. Similarly, channel equalizer 212 can output channel estimation information to a transversal filter 216 that receives information related to the Data2 portion of the transmission and outputs a signal for despreading and Walsh de-covering.

FIG. 2 illustrates a structure for a linear adaptive equalizer receiver wherein training of the equalizer 212 is based on the common midamble. Such training can be driven by the error of a filtered midamble with a desired reference sequence, d. In a common midamble allocation scheme, the sequence d can be the midamble sequence corresponding to the common midamble. For instance, such can be described as $d=m_{i,j}$, where the index "i" can indicate a specific basic midamble sequence (e.g. characterizing a particular nodeB), and the index "j" can indicate a specific offset of the basic midamble sequence. Thus, the total energy in the midamble portion of the transmission time slot is utilized for training the equalizer.

Figure 3:
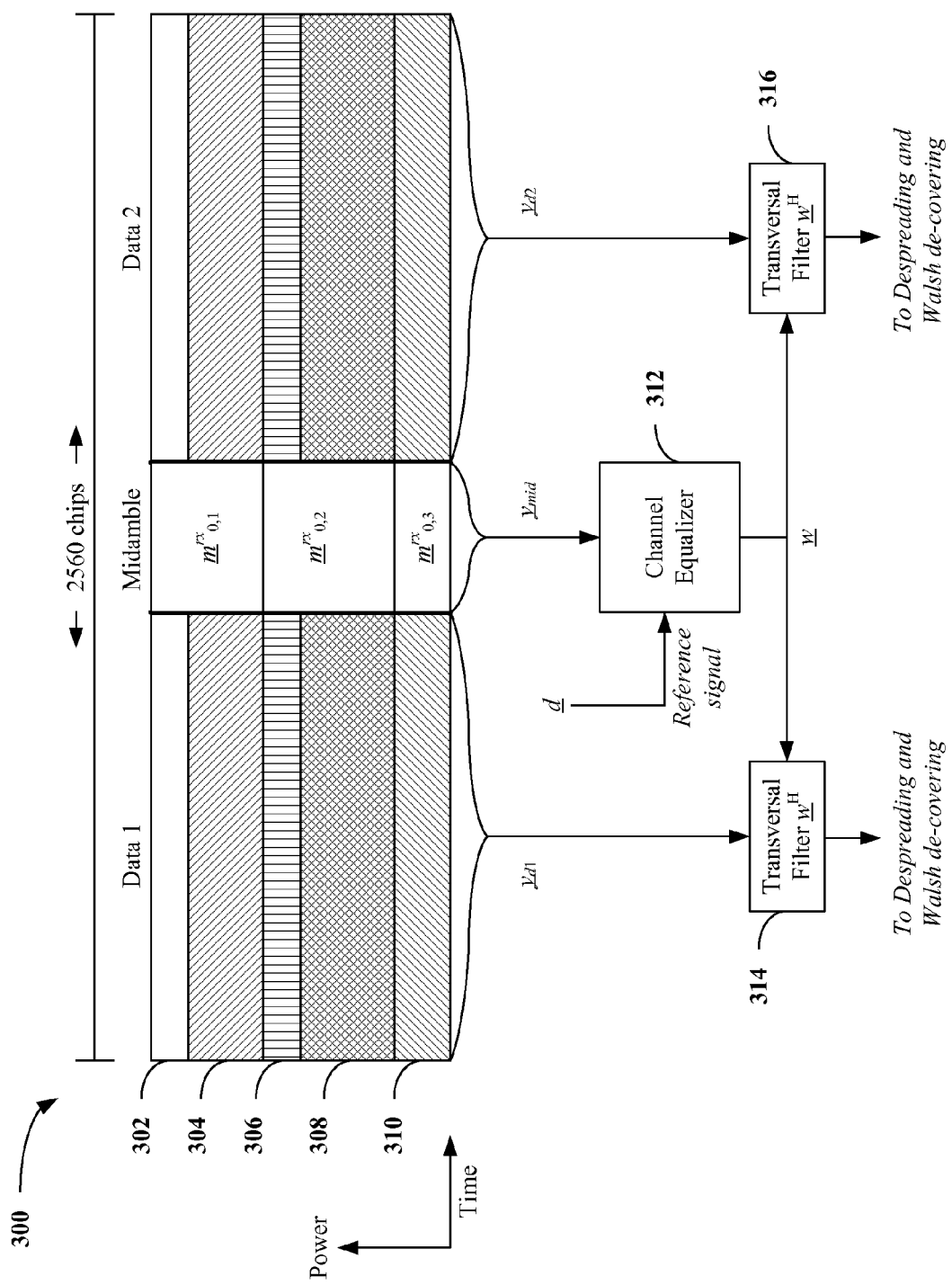
FIG. 3 illustrates a system that facilitates exploiting a non-common midamble allocation in conjunction with a linear adaptive equalizer receiver on downlink transmissions in a UMTS TDD communication environment, in accordance with various aspects.

FIG. 3 illustrates a system 300 that facilitates exploiting a non-common midamble allocation in conjunction with a linear adaptive equalizer receiver on downlink transmissions in a UMTS TDD communication environment, in accordance with various aspects. System 300 comprises a plurality of user codes 302-310, each of which comprises two data portions, Data1 and Data2, separated by a training code (e.g., a midamble, a pilot, etc.), in a 2560-chip long time slot, such as is utilized in conjunction with a UMTS TDD communication protocol. It will be appreciated that although five user code sets are illustrated with regard to FIG. 3, more or fewer users and/or code sets may be utilized in conjunction with the systems and methods described herein, as will be appreciated by those skilled in the art. System 300 further comprises channel equalizer 312 that performs channel estimation based at least in part on information related to the midamble portions of user codes 302-310, and provides such channel estimation information a transversal filter 314 for the first data portion of the transmission, and a transversal filter 316 for the second data portion of the transmission. Transversal filters 314 and 316 can then output signals produced from their respective input data portions and in conjunction with channel estimation information from channel equalizer 312 for despreading and Walsh de-covering.

In the case of the default midamble allocation scheme, a particular set of codes 302-310, which may be utilized by the same or different users, are mapped to particular midamble sequences. According to the figure, a total of five user codes are mapped to three different midamble sequences. For example, user codes 302 and 304 are mapped to midamble sequence $m^{rx}_{0,1}$, user codes 306 and 308 are mapped to midamble sequence $m^{rx}_{0,2}$, and user code 310 is mapped to midamble sequence $m^{rx}_{0,3}$. Such midambles, in the absence of a beam-forming technique, can undergo the same channel and therefore can be shifted copies of the same basic midamble sequence convolved with the same channel impulse response, as will be appreciated by those skilled in the art. Thus, where equalizer 312 training is based on a single midamble, a reference signal for user code 302 can be, for example, the sequence $m^{rx}_{0,1}$. In such a scenario, only that portion of total midamble energy that corresponds to midamble sequence $m^{rx}_{0,1}$ is utilized for equalizer training. As a result, demodulation performance for a linear adaptive equalizer, such as equalizer 312, based on a single midamble sequence under a conventional non-common midamble allocation scheme can be diminished when compared to the common allocation scheme described with regard to FIG. 2, which utilizes the entirety of midamble energy when training an equalizer.

Figure 4:
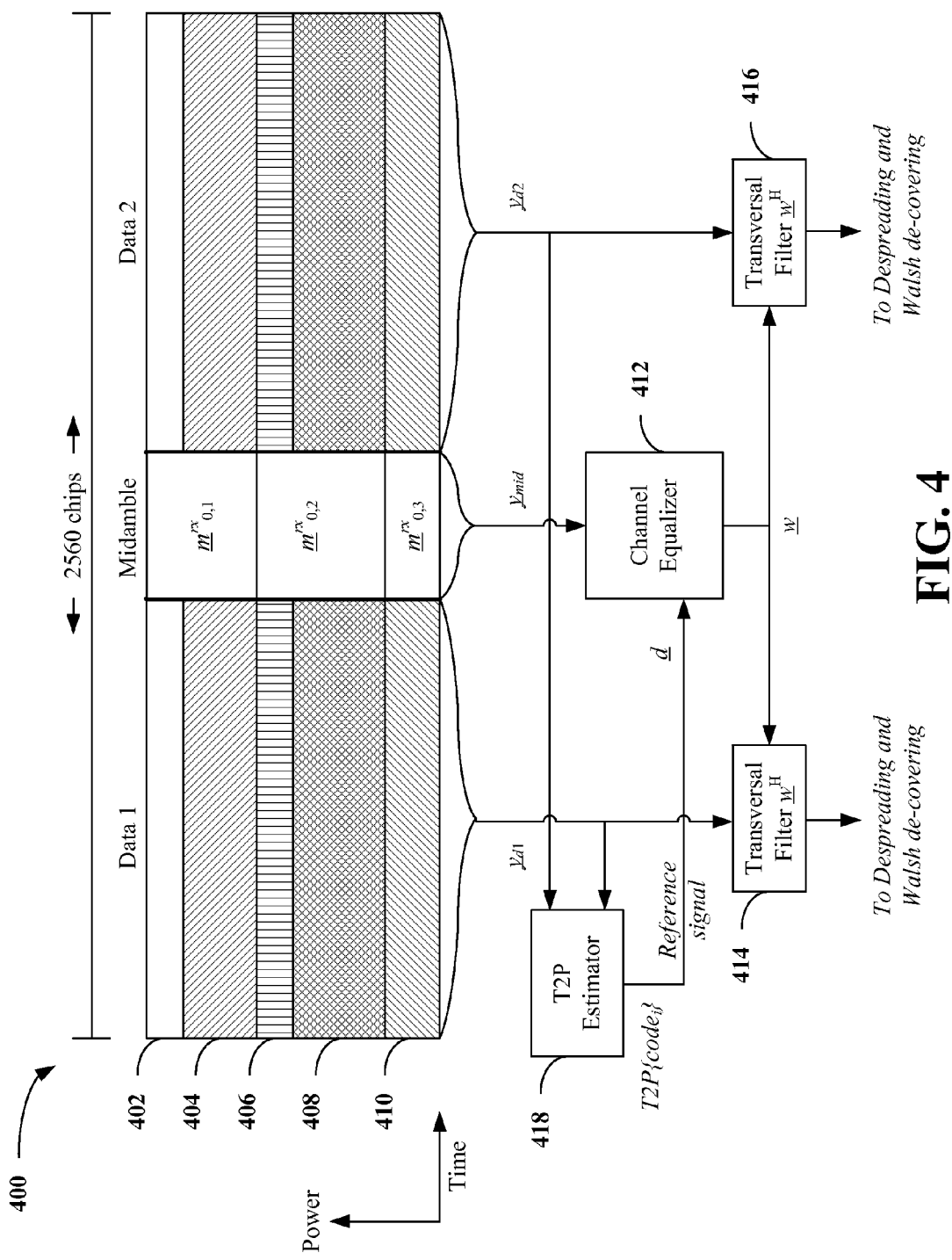
FIG. 4 is an illustration of a system that facilitates improving multiple midamble-based linear adaptive equalization in the presence of non-common midamble allocation, in accordance with one or more aspects presented herein.

FIG. 4 is an illustration of a system 400 that facilitates improving multiple midamble-based linear adaptive equalization in the presence of non-common midamble allocation, in accordance with one or more aspects presented herein. Such aspects can comprise generating a reference signal for equalizer training that is based on multiple midamble sequences, rather than on one of a plurality of midamble sequences as set forth above with regard to FIG. 3. System 400 can comprise a plurality of user codes 402, 404, 406, 408, and 410, in a transmission time slot, although more or fewer user codes can occupy the time slot, as will be appreciated by one skilled in the art. Each user code can comprise a first data portion, labeled "Data1," and a second data portion, "Data2," which can be separated by a midamble sequence. For instance, according to this example, the five user codes 402-410 are mapped to three different midamble sequences, such that user codes 402 and 404 are mapped to midamble sequence $m^{rx}_{0,1}$, user codes 406 and 408 are mapped to midamble sequence $m^{rx}_{0,2}$, and user code 410 is mapped to midamble sequence $m^{rx}_{0,3}$. It will further be understood that other permutations of user codes and associated midamble sequences are possible, and that the present example is not intended to be construed in a limiting sense.

A receiver structure can comprise a T2P ratio estimator 418 that can estimate a traffic-to-pilot energy ratio for each user code 402-410, and can provide such estimates to channel equalizer 412. As used herein, traffic energy and/or traffic power refers to the data portions of the user code channels and pilot power is synonymous with midamble power. T2P estimation can be based on, for instance, a fast Hadamard transform (FHT) protocol over the data portions of the transmission slot with an optimal threshold protocol that facilitates determining whether a particular user code channel (e.g., a Walsh code or the like) is used in the transmission time slot. For instance, a minimum power level can be predetermined, at or above which a channel can be presumed to be active.

T2P estimator 418 can determine a total amount of data traffic associated with Data1 and Data2 for all channel codes 402-410, and can determine a ratio thereof to midamble, or pilot, energy, such that T/p (traffic energy/pilot energy) can be evaluated. Such ratio information can then be provided to channel equalizer 412 for improved channel estimation on the downlink using a non-common midamble with a linear adaptive equalizer in a UMTS TDD communication environment. The traffic-to-pilot ratio can then be employed as a weighting factor. For instance, the square root of the T2P ratio for a given channel code can be multiplied by a channel estimate based on the midamble associated with the channel code to facilitate scaling the channel estimate.

Once the relative strength of all codes in known, the new reference signal, d, can be generated based on all active midambles in the time slot. In the case of a default midamble allocation scheme, there is a known mapping between user codes 402-410 and midamble sequences, such that a weight for a particular midamble sequence can be determined based on the sum of the relative strengths of all user codes mapping to that particular midamble sequence. For example, according to FIG. 4, a weight, $\alpha_2$, associated with midamble $m^{rx}_{0,2}$ can be based on the sum of the strengths of user codes 406 and 408 relative to the sum of all user codes, 402-410. Similar weights $\alpha_1$ and $\alpha_3$ can be determined for midambles $m^{rx}_{0,1}$ and $m^{rx}_{0,3}$, respectively, where $\alpha$ represents energy on data portions of user codes associated with respective midambles. The new reference signal can thus be generated using the sum of all weighted midambles, such that a T2P ratio generated by T2P estimator 418 for a particular user code can be described by the energy of that user code over the sum of all weighted midamble energies (e.g., the total midamble energy in the time slot. Additionally and/or alternatively, if a user-specific midamble allocation scheme is employed, an association between user codes and midambles can be known at the receiver in order to facilitate generating a reference signal based on more than one non-common midamble in the time slot.

Upon generation of the improved reference signal, training of the linear adaptive channel equalizer 412 can proceed according to standard protocols. In this manner, equalizer training can be performed utilizing the total aggregate energy of all midambles in the time slot, even in the presence of multiple midambles, which in turn facilitates improving energy detection and thus improving equalizer training.

System 400 thus illustrates a receiver structure for a linear adaptive equalizer receiver that operates in conjunction with a single midamble. To mitigate any degradation in demodulation performance associated with the utilization of a single non-common midamble, system 400 provides a structure that utilizes all available midamble energy, via T2P estimator 418, to improve equalizer training even in the absence of a common midamble. It will be appreciated by those skilled in the art that although the systems and methods described herein are set forth with regard to a linear adaptive equalizer, the same notion of generating a reference signal based on multiple non-common midambles can be employed for a pilot filter of a RAKE receiver, for channel estimation of a finger, etc.

Figure 5:
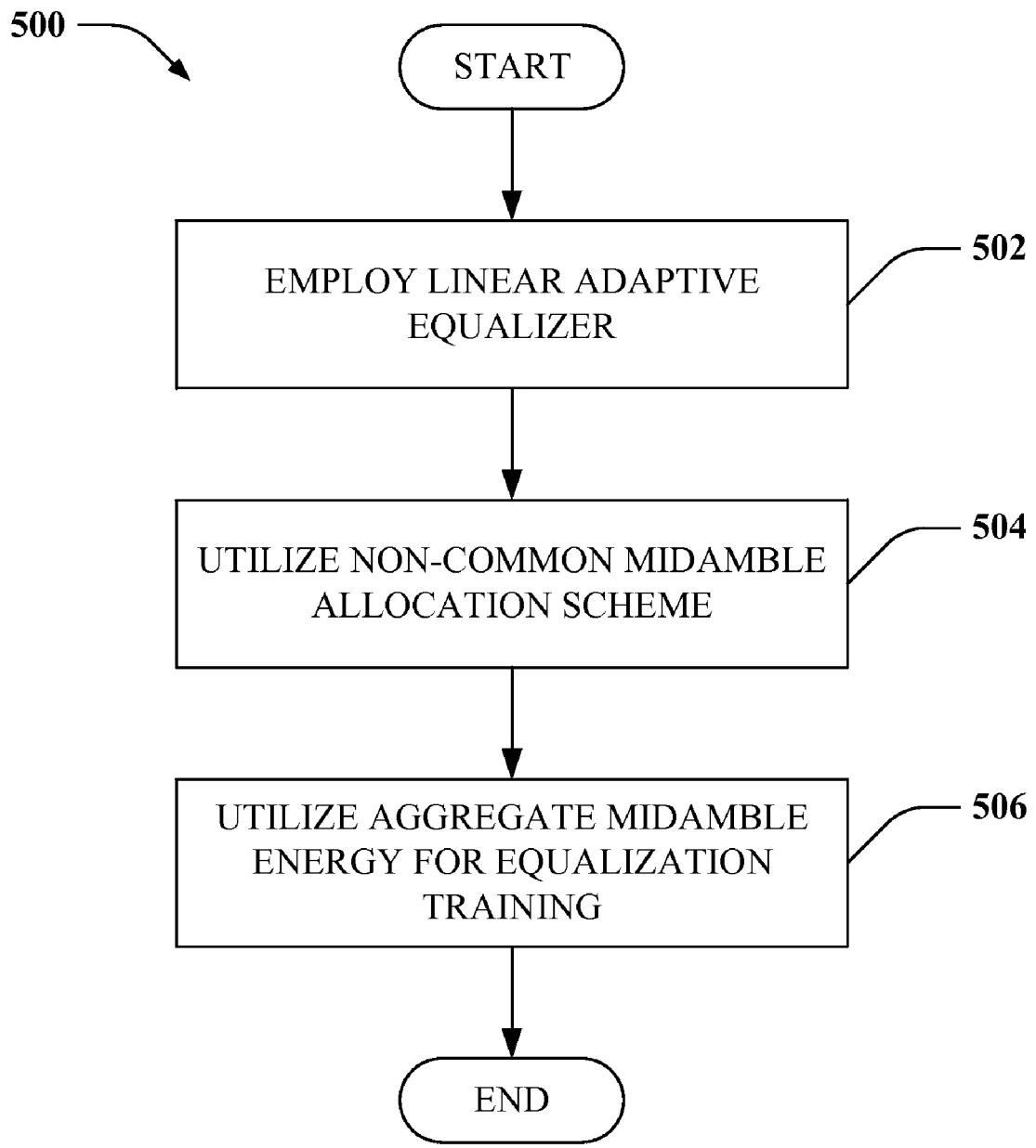
FIG. 5 is an illustration of a methodology for implementing a linear adaptive receiver in conjunction with a non-common midamble allocation scheme in UMTS TDD wireless communication system.
Figure 6:
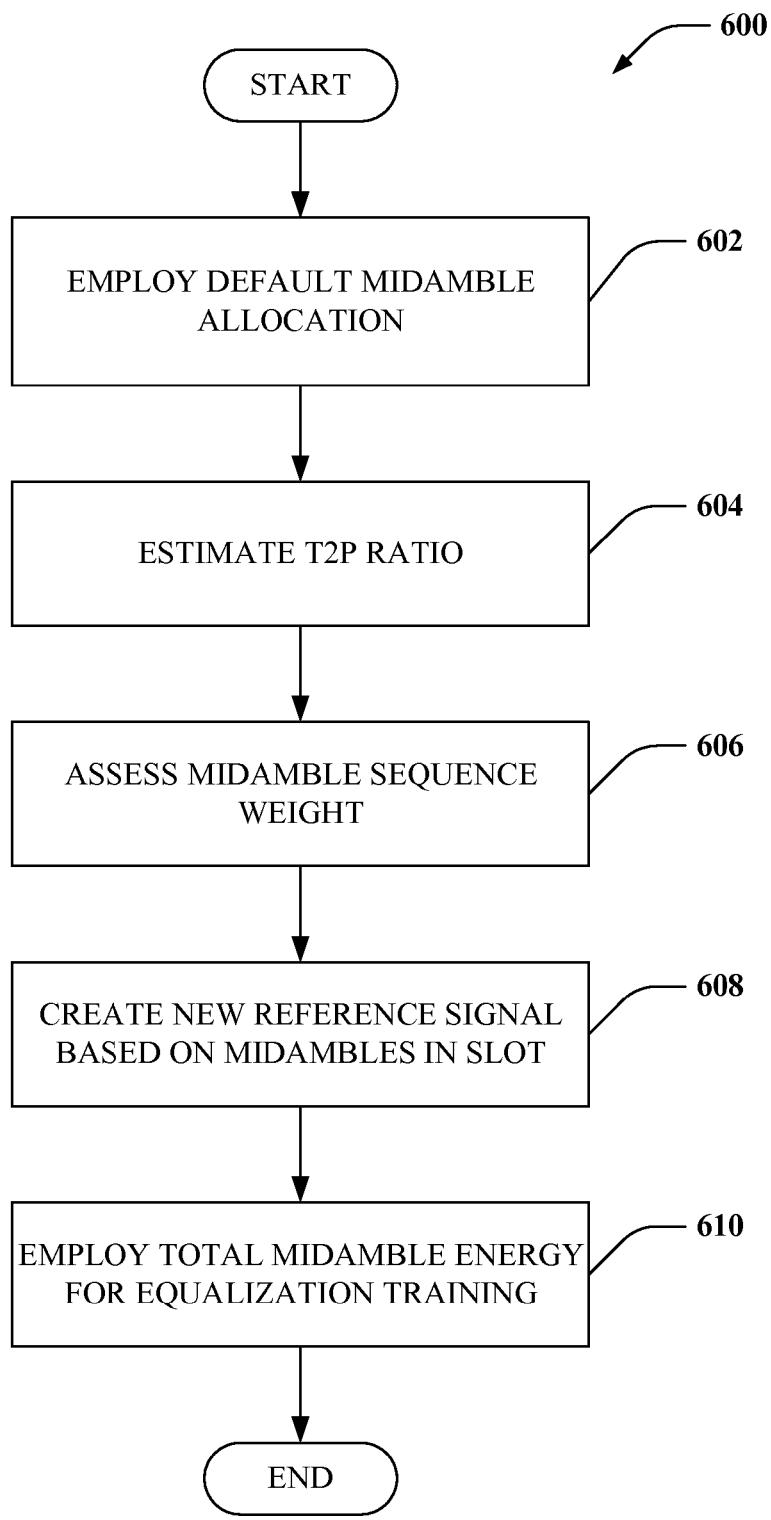
FIG. 6 is an illustration of a methodology for performing channel estimation in a UMTS TDD wireless communication environment utilizing a linear adaptive equalizer receiver and a non-common midamble allocation, in accordance with various aspects described herein.
Figure 7:
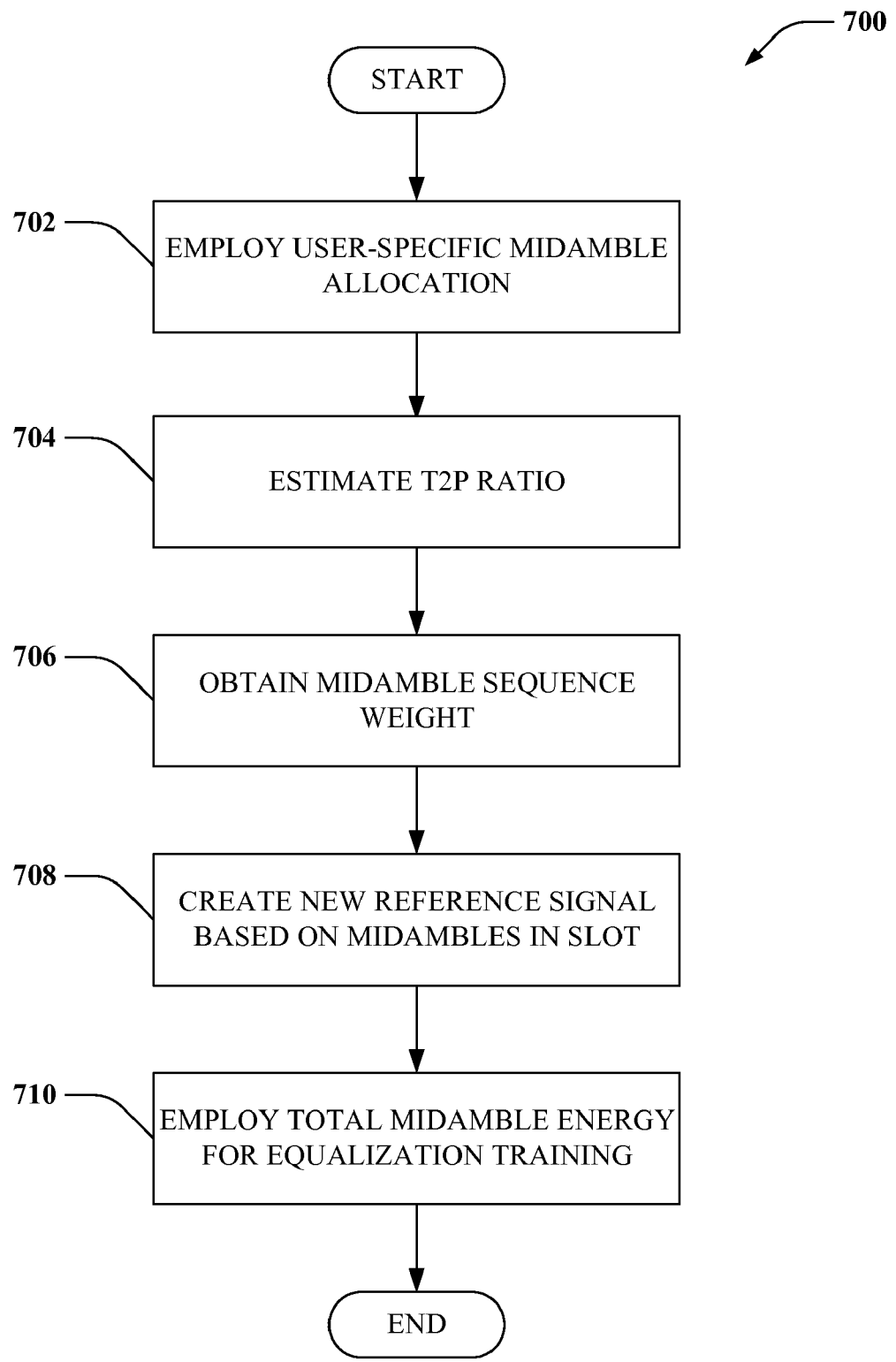
FIG. 7 illustrates a methodology for channels estimation using total midamble energy in a transmission time slot while employing a user-specific midamble allocation scheme in conjunction with a linear adaptive equalizer receiver, in accordance with various embodiments.

Referring to FIGS. 5-7, methodologies relating to utilizing a non-common midamble allocation scheme in conjunction with a linear adaptive equalizer receiver are illustrated. For example, methodologies can relate to employing a non-common midamble with a receiver in a UMTS TDD wireless environment, an OFDM environment, an OFDMA environment, a CDMA environment, a TDMA environment, a TDD environment, an SDMA environment, or any other suitable wireless environment. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more embodiments.

FIG. 5 is an illustration of a methodology 500 for implementing a linear adaptive receiver in conjunction with a non-common midamble allocation scheme in UMTS TDD wireless communication system. At 502, a linear adaptive equalizer receiver can be employed. Such receiver can be employed in a mobile device such as a cellular phone, a smartphone, a PDA, a laptop computer, a personal computer, a global positioning system, a handheld computing device, a handheld communication device, or any other suitable mobile device, as will be appreciated by those skilled in the art. At 504, a non-common midamble allocation scheme can be employed, such as a user-specific midamble allocation, a default midamble allocation, or the like, as depicted with regard to FIG. 4.

At 506, aggregate midamble energy in a transmission time slot can be utilized to train the equalizer, wherein the aggregate midamble energy comprises a sum of all weighted energies of active midambles in the time slot. Weighting the midambles can comprise performing an estimation of the traffic-to-pilot ratio of energy associated with data portions of the time slot compared to midamble portions. Such estimates can be employed to generate a reference signal that utilizes the total energy of all midambles in the time slot, which can be provided to the equalizer for training to facilitate estimating a channel for a user device comprising the equalizer, as described with regard to the preceding figures. It will further be appreciated that although various aspects described herein relate to a linear adaptive receiver employed in a mobile device, such receiver can additionally and/or alternatively be utilized in conjunction with a base station, nodeB, or the like. Moreover, the methodologies described herein can be employed to improve channel estimation via an improved reference signal for a RAKE receiver using a non-common midamble allocation.

FIG. 6 is an illustration of a methodology 600 for performing channel estimation in a UMTS TDD wireless communication environment utilizing a linear adaptive equalizer receiver and a non-common midamble allocation, in accordance with various aspects described herein. At 602 a default midamble allocation scheme can be employed to transmit a communication signal in a time slot to a user device. At 604, traffic energies for each set of user codes can be estimated on each physical channel sent of a data portion of a time slot. The time slot can be, for example, a 2560-chip time slot, such as a typically employed in conjunction with a UMTS TDD communication system. Additionally at 604, midamble energy can be evaluated, to facilitate performing a T2P ratio estimation as described with regard to preceding figures. At 606, midamble sequence weights can be evaluated and/or assessed based at least in part on the T2P ratios determined at 604.

At 608, a new reference signal can be generated and provided to the linear adaptive equalizer. The reference signal can comprise the sum of active weighted midambles in the time slot, such that at 610, the equalizer can be trained using all midamble energy in the time slot, which can facilitate providing greater midamble energy than is available using conventional default and/or user-specific midamble allocation schemes. It will be appreciated that methodology 600 can be utilized in conjunction with a pilot filter in a RAKE receiver, or any other suitable receiver that can benefit from the improved reference signal generated in conjunction with the T2P ratio.

It will further be appreciated that channel estimation can be facilitated by employment of a the improved reference signal using non-common midamble allocation because the total energy at which the midambles are transmitted is higher than can be achieved using a single midamble in the default midamble allocation (e.g., wherein a plurality of midambles are allocated across available bandwidth energy). That is, by utilizing a total midamble energy, power is not divided. Each user's gain can proportional to the midamble, such that estimation of midambles or channels can facilitate obtaining information about gains associated therewith.

FIG. 7 illustrates a methodology 700 for channels estimation using total midamble energy in a transmission time slot while employing a user-specific midamble allocation scheme in conjunction with a linear adaptive equalizer receiver, in accordance with various embodiments. At 702, a user-specific midamble allocation can be employed whereby specific user devices are assigned specific non-common midambles. At 704, a T2P estimate can be made, which can entail estimating a total portion of a user channel allocated to data transfer compared to a portion of the channel allocated to a training sequence (pilot, midamble), which is typically sandwiched in between data portions in a transmission time slot. For example, fast Hadamard transform (FHT)-based procedures can be utilized to determine the relative power strength of each of a plurality of codes the time slot.

The T2P ratio can be utilized to generate weights for different midambles in a non-common midamble allocation scheme, at 706. Upon generation of the T2P-based midamble weights, a new reference signal can be generated at 708. At 710, total midamble energy can be employed to permit channel estimation in, for example, a linear adaptive equalizer receiver, a RAKE receiver, or any other suitable receiver type. Such midamble energy can comprise, for instance, a sum of all weighted non-common midambles in the transmission time slot, and can be utilized to evaluate the reference signal to train the equalizer.

It will be appreciated that, in accordance with one or more embodiments and/or methods described herein, inferences can be made regarding channel estimation, T2P ratios, etc. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

According to an example, one or more methods presented above can include making inferences regarding a number of active codes in a time slot based at least in part, for instance, on a number of active codes detected in a previous time slot and a total power level detected in the previous time slot as compared to total power detected in a current time slot. To further this example, four active codes (e.g., users, subsets of Walsh codes, etc.) can be detected in a first time slot, with a total power output of X. In a subsequent time slot, it may be determined that total power detected is some value less than X (e.g., 0.7X, 0.75X, 0.8X, ...). Based on the detected decrease in total power consumption in the subsequent time slot, an inference can be made that at least one previously detected active code sets is no longer active. Such inference can then be employed to facilitate making a decision to reevaluate a number of active codes in the subsequent time slot prior to T2P ratio determination, channel estimation, and the like. It will be appreciated that the foregoing example is illustrative in nature, and is not intended to limit the manner in which inferences can be made or the number of inferences that can be made in conjunction with they various systems and/or methods presented herein.

Figure 8:
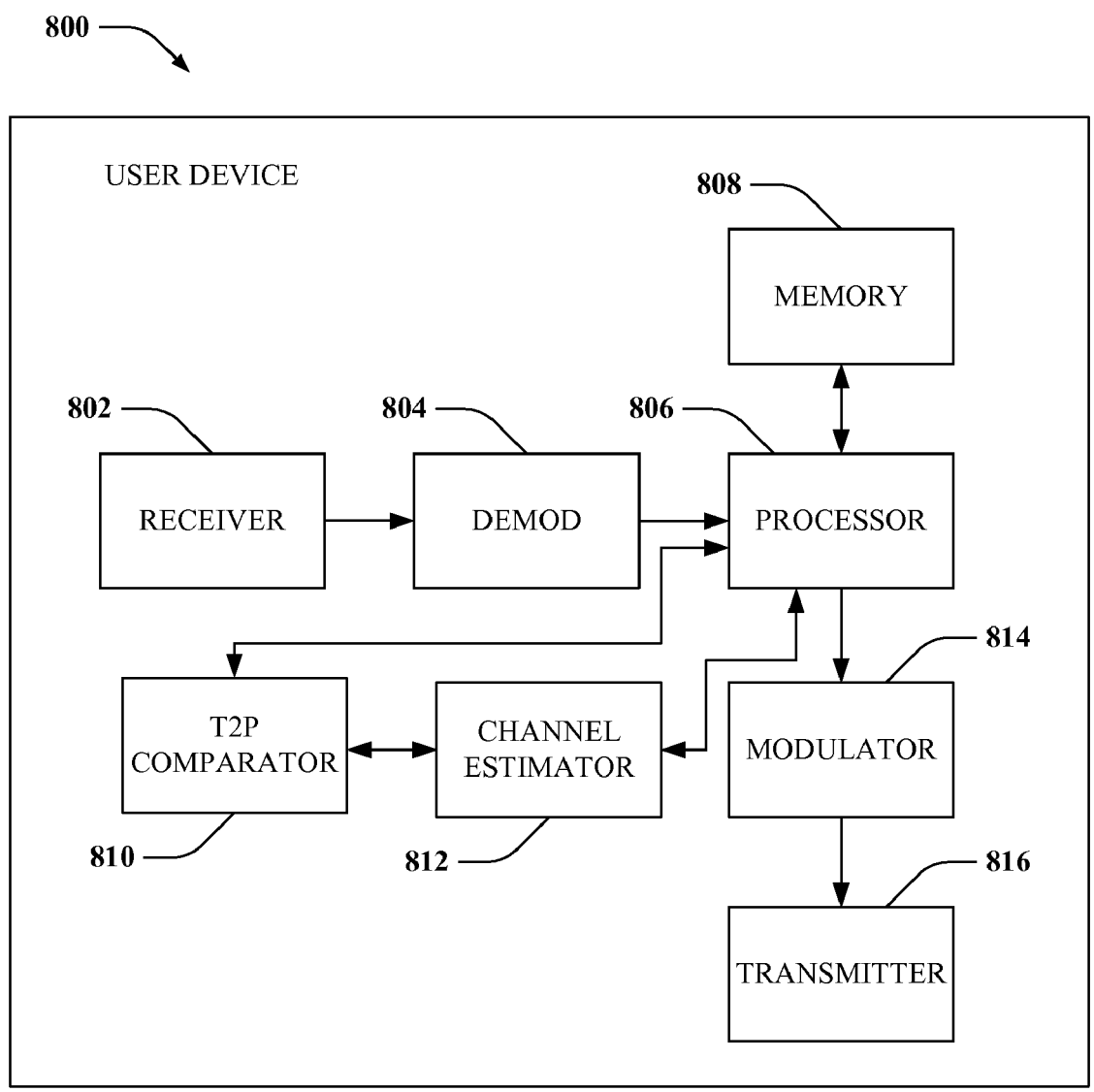
FIG. 8 is an illustration of a user device that facilitates employing a non-common midamble allocation with a linear adaptive equalizer receiver in a UMTS TDD wireless communication environment, in accordance with one or more embodiments described herein.

FIG. 8 is an illustration of a user device 800 that facilitates employing a non-common midamble allocation with a linear adaptive equalizer receiver in a UMTS TDD wireless communication environment, in accordance with one or more embodiments described herein. User device 800 comprises a receiver 802 that receives a signal from, for instance, a receive antenna, and performs typical actions (e.g., filters, amplifies, downconverts, etc.) on the received signal and digitizes the conditioned signal to obtain samples. Receiver 802 can be a linear adaptive equalizer receiver as set forth with regard to preceding figures. A demodulator 804 can obtain received symbols for subbands for each symbol period, as well as provide received pilot symbols to a processor 806 for channel estimation.

Processor 806 can be a processor dedicated to analyzing information received by receiver component 802 and/or generating information for transmission by a transmitter 816, a processor that controls one or more components of user device 800, and/or a processor that both analyzes information received by receiver 802, generates information for transmission by transmitter 816 and controls one or more components of user device 800.

User device 800 can additionally comprise memory 808 that is operatively coupled to processor 806 and that stores information related to a T2P comparator 810 that provides T2P ratio estimates to a channel estimator 812 that facilitates estimating a channel over which the user device can communicate. Memory 808 can additionally store information associated with sector identities, non-common midambles employed thereby, etc., such that user device 800 can employ stored protocols, algorithms, information to facilitate generation of a reference signal based on aggregate non-common midamble power as described herein.

It will be appreciated that the data store (e.g., memories) components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 808 of the subject systems and methods is intended to comprise, without being limited to, these and any other suitable types of memory.

Processor 808 is further coupled to channel estimator 812, which can facilitate estimating communication channels, based at least in part on information stored in memory 808 and/or information received and processed by processor 806. Channel estimator 812 can be operatively associated with T2P comparator 810, which can also be coupled to processor 806. User device 800 still further comprises a symbol modulator 814 and a transmitter 816 that transmits the modulated signal of the channel estimated by channel estimator 812 using a reference signal comprising weighted midamble information based at least in part on T2P estimations provided by T2P comparator 810.

Figure 9:
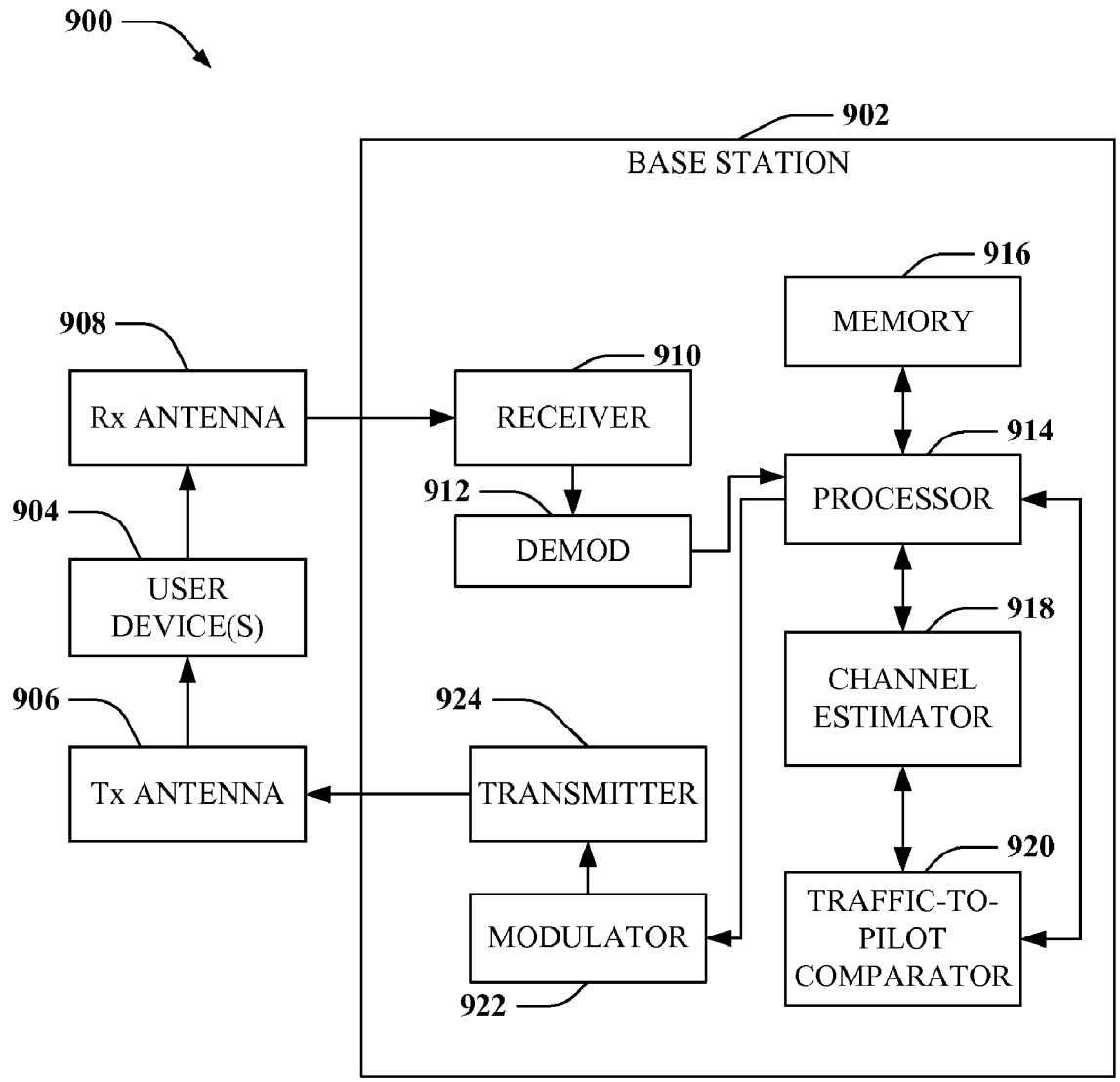
FIG. 9 is an illustration of a system that facilitates employing a linear adaptive equalizer receiver in conjunction with a non-common midamble allocation scheme to provide a reference signal based al least in part on a traffic-to-pilot energy ratio in a UMTS TDD wireless communication environment, in accordance with one or more aspects set forth herein.

FIG. 9 is an illustration of a system 900 that facilitates employing a linear adaptive equalizer receiver in conjunction with a non-common midamble allocation scheme to provide a reference signal based al least in part on a traffic-to-pilot energy ratio in a UMTS TDD wireless communication environment, in accordance with one or more aspects set forth herein. System 900 comprises a base station 902 that communicates with one or more user devices 904 via a transmit antenna 906 and a receive antenna 908, although more than one transmit and receive antenna can be employed in conjunction with various aspects. Base station 902 comprises a receiver 910, such as a linear adaptive equalizer receiver, that receives information from receive antenna 908 and is operatively associated with a demodulator 912 that demodulates received information. Demodulated symbols can be analyzed by a processor 914 that is similar to the processor described above with regard to FIG. 8, which is coupled to a memory 916 that stores information related to user devices 904, a non-common midambles utilized by base station 902, time slot information and the like, resource allocations, and/or any other suitable information related to permitting base station 902 to utilize a non-common midamble allocation scheme in conjunction with a linear adaptive equalizer receiver as described herein.

Processor 914 is further coupled to a channel estimator 918 that can process information related to data portions of a one or more channels in a communication time slot, etc., to permit a modulator 922 and/or transmitter 924 in base station 902 to appropriately modulate and transmit a communication signal to user device 904 via transmit antenna 906. Additionally, channel estimator 918 is operatively coupled to a T2P comparator 920 that determines a ratio of traffic-to-pilot energy for a given channel in the time slot (e.g., data-to-midamble energy, etc.), which ratio value can be utilized to weight a non-common midamble. For example, a non-common midamble can be weighted by multiplying the non-common midamble by the square root(s) of T2P ratio(s) for channel code(s) to which the non-common midamble is allocated. Total midamble power can be, for example, a sum of all weighted midambles employed in the time slot.

Channel estimator 918 can estimate relative power strength for each of a plurality of active codes in a time slot for respective user devices 904. For instance, channel estimator 918 and/or processor 914 can employ a fast Hadamard transform to perform power estimation. Midamble, or pilot, power strength can be determined directly from the midamble portion of the time slot, and T2P comparator 902 can thereby generate the traffic-to-pilot ratio for each active code. Channel estimator 918 can then multiply a channel estimate from a midamble by a square root of the T2P ratio for a given code associated therewith, to provide a scaled channel estimate for a given user device 904 for downlink transmission. Once all midambles have been weighted, their aggregate energy can be utilized to facilitate improved channel equalization, which provides increased energy for power detection over conventional systems that employ only a single non-common midamble. It will be appreciated that utilization of the aggregate energy associated with all non-common midambles ensures that midamble power is not divided between codes or users, and thus is easier to detect than a given individual user-specific or default midamble, which in turn permits improved detectability and therefore improved channel estimation.

Figure 10:
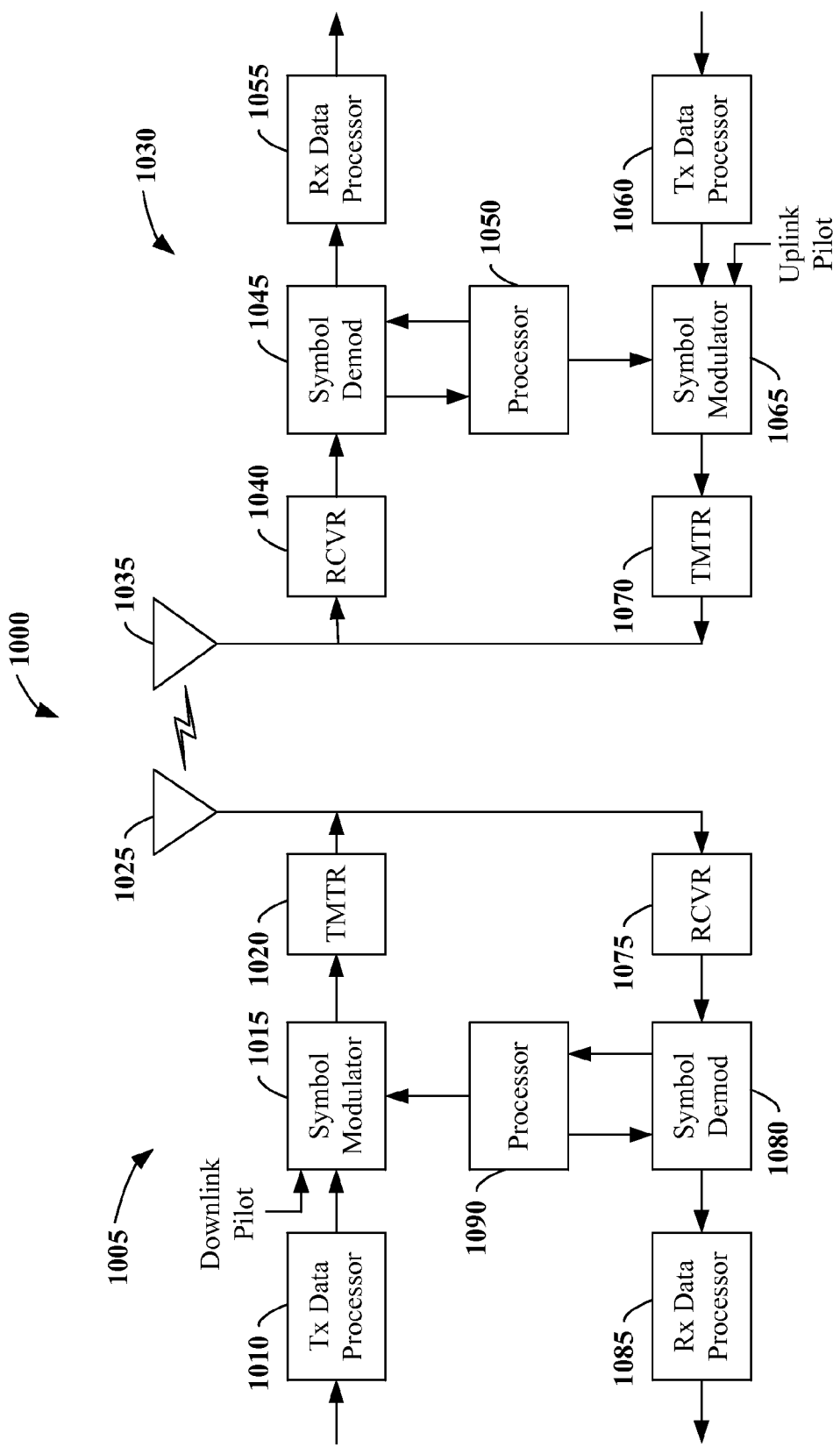
FIG. 10 is an illustration of a wireless network environment that can be employed in conjunction with the various systems and methods described herein.

It FIG. 10 shows an exemplary wireless communication system 1000. The wireless communication system 1000 depicts one base station and one terminal for sake of brevity. However, it is to be appreciated that the system can include more than one base station and/or more than one terminal, wherein additional base stations and/or terminals can be substantially similar or different for the exemplary base station and terminal described below. In addition, it is to be appreciated that the base station and/or the terminal can employ the systems (FIGS. 1-4 and 8-9) and/or methods (FIGS. 5-7) described herein to facilitate wireless communication there between.

Referring now to FIG. 10, on a downlink, at access point 1005, a transmit (TX) data processor 1010 receives, formats, codes, interleaves, and modulates (or symbol maps) traffic data and provides modulation symbols ("data symbols"). A symbol modulator 1015 receives and processes the data symbols and pilot symbols and provides a stream of symbols. A symbol modulator 1020 multiplexes data and pilot symbols and provides them to a transmitter unit (TMTR) 1020. Each transmit symbol may be a data symbol, a pilot symbol, or a signal value of zero. The pilot symbols may be sent continuously in each symbol period. The pilot symbols can be frequency division multiplexed (FDM), orthogonal frequency division multiplexed (OFDM), time division multiplexed (TDM), frequency division multiplexed (FDM), or code division multiplexed (CDM).

TMTR 1020 receives and converts the stream of symbols into one or more analog signals and further conditions (e.g., amplifies, filters, and frequency upconverts) the analog signals to generate a downlink signal suitable for transmission over the wireless channel. The downlink signal is then transmitted through an antenna 1025 to the terminals. At terminal 1030, an antenna 1035 receives the downlink signal and provides a received signal to a receiver unit (RCVR) 1040. Receiver unit 1040 conditions (e.g., filters, amplifies, and frequency downconverts) the received signal and digitizes the conditioned signal to obtain samples. A symbol demodulator 1045 demodulates and provides received pilot symbols to a processor 1050 for channel estimation. Symbol demodulator 1045 further receives a frequency response estimate for the downlink from processor 1050, performs data demodulation on the received data symbols to obtain data symbol estimates (which are estimates of the transmitted data symbols), and provides the data symbol estimates to an RX data processor 1055, which demodulates (i.e., symbol demaps), deinterleaves, and decodes the data symbol estimates to recover the transmitted traffic data. The processing by symbol demodulator 1045 and RX data processor 1055 is complementary to the processing by symbol modulator 1015 and TX data processor 1010, respectively, at access point 1005.

On the uplink, a TX data processor 1060 processes traffic data and provides data symbols. A symbol modulator 1065 receives and multiplexes the data symbols with pilot symbols, performs modulation, and provides a stream of symbols. A transmitter unit 1070 then receives and processes the stream of symbols to generate an uplink signal, which is transmitted by the antenna 1035 to the access point 1005.

At access point 1005, the uplink signal from terminal 1030 is received by the antenna 1025 and processed by a receiver unit 1075 to obtain samples. A symbol demodulator 1080 then processes the samples and provides received pilot symbols and data symbol estimates for the uplink. An RX data processor 1085 processes the data symbol estimates to recover the traffic data transmitted by terminal 1030. A processor 1090 performs channel estimation for each active terminal transmitting on the uplink. Multiple terminals may transmit pilot concurrently on the uplink on their respective assigned sets of pilot subbands, where the pilot subband sets may be interlaced.

Processors 1090 and 1050 direct (e.g., control, coordinate, manage, etc.) operation at access point 1005 and terminal 1030, respectively. Respective processors 1090 and 1050 can be associated with memory units (not shown) that store program codes and data. Processors 1090 and 1050 can also perform computations to derive frequency and impulse response estimates for the uplink and downlink, respectively.

For a multiple-access system (e.g., FDMA, OFDMA, CDMA, TDMA, etc.), multiple terminals can transmit concurrently on the uplink. For such a system, the pilot subbands may be shared among different terminals. The channel estimation techniques may be used in cases where the pilot subbands for each terminal span the entire operating band (possibly except for the band edges). Such a pilot subband structure would be desirable to obtain frequency diversity for each terminal. The techniques described herein may be implemented by various means. For example, these techniques may be implemented in hardware, software, or a combination thereof. For a hardware implementation, the processing units used for channel estimation may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. With software, implementation can be through modules (e.g., procedures, functions, and so on) that perform the functions described herein. The software codes may be stored in memory unit and executed by the processors 1090 and 1050.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor via various means as is known in the art.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method of training a linear adaptive equalizer using an aggregation of non-common midamble energies to improve throughput in a wireless communication environment, comprising:
    detecting multiple non-common pilot sequences in channel codes received in a time slot;
    generating a reference signal based at least in part on multiple non-common pilot sequences;
    utilizing the reference signal to train the linear adaptive equalizer to perform channel equalization based at least in part on information from the midamble portions of user codes; and
    further comprising determining a traffic-to-pilot ratio for an active channel code;
    wherein determining the traffic-to-pilot ratio comprises estimating relative power of a first data portion of the active code and a second data portion of the active code in the time slot and dividing a total relative power of the data portions by the transmission power of the non-common pilot associated with the active channel code in the wireless communication environment.

2. The method of claim 1, further comprising employing a default pilot allocation scheme.

3. The method of claim 2, further comprising providing a linear adaptive equalizer with a mapping of channel codes to pilot sequences.

4. The method of claim 3, further comprising determining a weight for a pilot sequence based at least in part on a sum of the relative strengths of channels codes mapped to the pilot sequence.

5. The method of claim 4, further comprising employing an aggregate value associated with a plurality of weighted non-common pilot sequences to generate the reference signal.

6. The method of claim 1, further comprising employing a user-specific pilot allocation scheme.

7. The method of claim 6, further comprising providing a linear adaptive receiver with a mapping of channel codes to pilot sequences.

8. The method of claim 7, further comprising determining a weight for a pilot sequence base at least in part on a sum of relative strength of a channel code associated with the pilot sequence.

9. The method of claim 8, further comprising employing a plurality of weighted pilot sequences to generate the reference signal.

10. The method of claim 1, further comprising employing a fast Hadamard transform to estimate the relative power of the first and second data portions of the signal.

11. A wireless communication apparatus that facilitates permitting linear adaptive equalization based on multiple non-common midambles to improve throughput in a wireless communication environment, comprising:
    a receiver that receives a signal with a non-common pilot allocation comprising multiple non-common pilot sequences;
    a memory that stores information related to a channel codes and associated non-common pilot sequences;
    a processor that analyzes information stored in the memory and generates a reference signal based at least in part on multiple weighted pilot sequences, determines a traffic-to-pilot power ratio; and
    wherein the receiver is a linear adaptive equalizer; and
    said processor utilizes the reference signal to train the linear adaptive equalizer to perform channel equalization based at least in part on information from the midamble portions of user codes; and
    wherein determining the traffic-to-pilot ratio comprises estimating relative power of a first data portion of the active code and a second data portion of the active code in the time slot and dividing a total relative power of the data portions by the transmission power of the non-common pilot associated with the active channel code in the wireless communication environment.

12. The apparatus of claim 11, further comprising a traffic-to-pilot estimator that determines a traffic-to-pilot ratio for at least one channel code and a pilot associated therewith.

13. The apparatus of claim 12, wherein the traffic-to-pilot estimator performs a fast Hadamard transform protocol to estimate the relative power strength of each of a plurality of channel codes.

14. The apparatus of claim 11, the non-common pilot allocation is a default pilot allocation.

15. The apparatus of claim 14, wherein the processor analyzes information stored in the memory related to a mapping of channel codes to pilot sequences and determines an appropriate weight for each pilot sequence based at least in part on a sum of the relative strengths of all channel codes mapping to respective pilot sequences.

16. The apparatus of claim 15, wherein the processor generates the reference signal with information related to an aggregate pilot energy comprising the sum of weighted pilots in the received signal.

17. The apparatus of claim 16, wherein the processor provides the reference signal to the linear adaptive equalizer to train the equalizer using the aggregate energy of multiple non-common pilot sequences.

18. The apparatus of claim 11, employed in a UMTS communication environment.

19. The apparatus of claim 18, the UMTS communication environment is a UMTS terrestrial radio access communication environment.

20. A non-transitory computer-readable medium having stored thereon computer-executable instructions for training a linear adaptive equalizer using an aggregation of non-common midamble energies to improve throughput in a wireless communication environment, comprising:
    receiving a signal with a default pilot sequence allocation;
    evaluating a traffic-to-pilot ratio for channel codes in the signal;
    generating a reference signal based at least in part on multiple default pilot sequences; and
    instructions for utilizing the reference signal to train the linear adaptive equalizer to perform channel equalization based at least in part on information from the midamble portions of user codes; and
    wherein evaluating the traffic-to-pilot ratio comprises estimating relative power of a first data portion of the active code and a second data portion of the active code in the time slot and dividing a total relative power of the data portions by the transmission power of the non-common pilot associated with the active channel code in the wireless communication environment; and further comprising instructions for estimating a data portion of a channel code in the time slot.

21. The computer-readable medium of claim 20, further comprising instructions performing a fast Hadamard transform to estimate the data portion of the channel code in the time slot.

22. A processor in a wireless communications device that executes instructions for employing a linear adaptive equalizer in conjunction with a non-common pilot allocation protocol in a time slot of a downlink transmission to improve throughput in a wireless communication environment, the instructions comprising:

receiving a signal with a default pilot sequence allocation;

evaluating a traffic-to-pilot ratio for channel codes in the signal;

generating a reference signal based at least in part on multiple default pilot sequences;

utilizing the reference signal to train the linear adaptive equalizer to perform channel equalization based at least in part on information from the midamble portions of user codes; and further comprising instructions for weighting pilot sequences according to traffic-to-pilot ratios derived for a plurality of channel codes in a time slot of the signal; and wherein evaluating the traffic-to-pilot ratio comprises estimating relative power of a first data portion of the active code and a second data portion of the active code in the time slot and dividing a total relative power of the data portions by the transmission power of the non-common pilot associated with the active channel code in the wireless communication environment.

23. The processor of claim 22, employed in a UMTS TDD wireless communication environment.

24. A user device that facilitates permitting linear adaptive equalization based on multiple non-common midambles to improve throughput in a wireless communication environment, comprising:

a linear adaptive equalizer that receives a signal comprising multiple non-common pilot sequences; and a processor that estimates a data portion of a user code in a time slot, determines a traffic-to-pilot power ratio;

said processor generates a reference signal for training the linear adaptive equalizer to perform channel equalization based at least in part on multiple non-common pilot sequences and traffic-to-pilot power ratios; and wherein determining the traffic-to-pilot ratio comprises estimating relative power of a first data portion of the active code and a second data portion of the active code in the time slot and dividing a total relative power of the data portions by the transmission power of the non-common pilot associated with the active channel code in the wireless communication environment.

25. The user device of claim 24, wherein the device is at least one of a cellular phone, a smartphone a PDA, a laptop, a handheld communication device, a handheld computing device, a satellite radio, and a global positioning system device.

* * * * *